Oct. 9, 1962 R. O. CASE, JR 3,057,555

ELECTRONIC COMPUTER

Filed June 2, 1958 4 Sheets-Sheet 1

INVENTOR.
ROBERT O. CASE, Jr.

BY Louis J. Knobbe

AGENT

INVENTOR.
ROBERT O. CASE, Jr.
BY Louis J. Knobbe
AGENT

ELECTRONIC COMPUTER

Filed June 2, 1958 4 Sheets-Sheet 3

INVENTOR.
ROBERT O. CASE, Jr.
BY
Louis J. Knobbe
AGENT

INVENTOR.
ROBERT O. CASE, Jr.

BY Louis J. Knobbe
AGENT

United States Patent Office 3,057,555
Patented Oct. 9, 1962

3,057,555
ELECTRONIC COMPUTER
Robert O. Case, Jr., Whittier, Calif., assignor to North American Aviation, Inc.
Filed June 2, 1958, Ser. No. 739,319
19 Claims. (Cl. 235—195)

This invention relates to electronic computers and particularly to those employing time division techniques for multiplication and division.

Devices for computing the product and quotient of analog quantities are commonly used elements in analog computers. Electromechanical multiplying devices, usually consisting of an assembly of motor-driven potentiometers, are well known in the prior art. Examples of this type of multiplier are illustrated in Patent No. 2,725,192 of LeRoy E. Kolderup and Patent No. 2,726,365 of K. A. Bilderback. This type of multipying device requires extremely linear potentiometers to provide the necessary accuracy. This requirement, coupled with the necessity of using very small diameter wire for improving the resolution, results in a component that is difficult and costly to manufacture on a production basis. A further objection to this type of multiplier is that it is too slow, i.e., it has a comparatively low frequency response. The electromechanical multiplying devices are also handicapped by being large and heavy in comparison to electronic devices.

Several types of electronic multipliers are known in the prior art which provide a product of two or more instantaneous waveforms. Examples of this type of electronic multiplier are shown in Patent No. 2,519,223 of R. C. Cheek, Patent No. 2,700,135 of W. E. Tolles, Patent No. 2,784,324 of L. J. Craig and Patent No. 2,784,909 of G. N. Kirkpatrick. The input signals to these electronic multipliers usually comprise direct-current signals or relatively low frequency signals. If modulated carrier-frequency signals were introduced into these multiplying circuits, the resultant product would include a multiplication of the carrier waves rather than the modulation envelopes. For example, if the multiplier and multiplicand are represented by the respective signals $E_1f_1(t)\sin\omega_ct$ and $E_3f_3(t)\sin\omega_ct$, the resultant product of the instantaneous waveforms includes a $\sin^2\omega_ct$ or double frequency term but does not contain a frequency term corresponding to $\sin\omega_ct$.

The present invention, while of general utility, is particularly adapted for airborne analog computer applications. In this type of computer the signals are preferably in the form of suppressed-carrier modulated signals such as are provided by the amplitude modulator described in application Serial No. 707,317, now Patent No. 2,968,010 filed January 6, 1958, by the inventor of the present application and assigned to North American Aviation, Inc., assignee of the present invention. It is usually desired that the various modulated signals have a common carrier frequency. Thus, the output of the computing circuit is required to have an amplitude corresponding to the product and quotient of the amplitiudes of the respective multiplier, multiplicand, and divisor input signals and a frequency corresponding to the carrier frequency of the input signals. In order to adapt the aforementioned prior art electronic multiplier circuits for use with modulated signals having a common carrier frequency, it would be necessary to demodulate each of the input signals and apply the demodulated signals to the multiplier. The output signal of the multiplier circuit would then have to be remodulated at the carrier frequency. This is not a satisfactory solution since the non-linearity of the demodulators and modulator coupled with the drift of these components limits the overall accuracy of such a multiplier.

Patent No. 2,425,405 of A. W. Vance and Patent No. 2,497,883 of H. Harris, Jr. do permit one or more of the input signals to be modulated at a carrier frequency with a resultant product at the carrier frequency. However, the functioning of these devices inherently requires that at least one of the input signals be at a different frequency than that of the other inputs. Thus, the Vance circuit requires that the multiplier signal be a direct-current signal and the Harris Jr. circuit requires that the divisor have a different carrier frequency than the multiplicand and multiplier signals.

The present invention employs an adaptation of the time division technique. The time division multiplication principle is well known in the prior art as is illustrated in Patent No. 2,773,641 of R. V. Baum and the article entitled "A High-Accuracy Time-Division Multiplier" by Edwin A. Goldberg, published in the R.C.A. Review of September 1952. These multipliers, however, multiply the instantaneous waveforms of the input signals and, therefore, are unadapted for multiplying modulated input voltages. By eliminating the necessity for demodulating the input alternating-current signals, the present circuit not only provides a very accurate product and quotient computer, but also a completed package of small size and weight.

It is accordingly an object of this invention to provide an improved electronic computer.

It is also an object of this invention to provide an improved electronic computer embodying time division techniques.

It is another object of this invention to provide an electronic multiplier adapted to multiply amplitude-modulated signals and in particular suppressed-carrier amplitude-modulated signals.

It is additional object of this invention to provide an electronic multiplier adapted to multiply input amplitude-modulated signals without demodulating the input amplitude-modulated signals.

Another object of this invention is the provision of a computer which is wholly electronic in its operation.

A further object of this invention is to provide an electronic product and quotient computer which is relatively free of the errors usually caused by drift and nonlinearity of the computer elements.

It is a further object of this invention to provide an electronic computer for obtaining products and quotients in which the multiplicand, multiplier and divisor signals may have the same or different carrier frequencies.

It is still another object of this invention to provide an electronic multiplier and divider in which the multiplication and division are performed only with respect to the modulation envelope of the input signals.

A further object of this invention is to provide an electronic computer characterized by light weight and a physically small package.

It is another object of this invention to provide an electronic multiplier and divider having a sinusoidal output.

It is still another object of this invention to provide an electronic multiplier and divider having a relatively wide dynamic range.

A further object of this invention is to provide an electronic multiplier and divider having a relatively wide bandwidth.

It is another object of this invention to provide an electronic computer having an alternating signal output directly proportional in amplitude to the product of the amplitudes of a pair of modulated input signals and inversely proportional in amplitude to the amplitude of a third modulated input signal.

It is still another object of this invention to provide an electronic computer having a plurality of suppressed-carrier amplitude-modulated inputs each representing a different multiplicand, a suppressed-carrier amplitude-modulated input representing a multiplier, a suppressed-carrier amplitude-modulated input representing a divisor, and a plurality of output suppressed-carrier amplitude-modulated signals having the same carrier frequency as the multiplicand signal associated therewith and representing the product and quotient of each of the several multiplicands as multiplied and divided by the multiplier and divisor.

A further object of this invention is to provide an apparatus for modifying the carrier frequency of any amplitude-modulated wave without affecting its waveform, phase or amplitude.

Briefly, in accordance with one form of the present invention, an amplitude-modulated signal representing the multiplicand is periodically sampled at a relatively high frequency. The duty cycle of the sampling periods is directly proportional to the modulation envelope of an amplitude-modulated multiplier signal and inversely proportional to the modulation envelope of an amplitude-modulated divisor signal. The periodically sampled modulating waveform is passed through a bandpass filter which transmits the side bands of the modulated carrier-frequency signal and attenuates the frequencies of the sampling period and their associated harmonics. The output of the bandpass filter is an amplitude-modulated wave having an amplitude directly proportional to the product of the modulation envelopes of the multiplicand and multiplier signals, and inversely proportional to the modulation envelope of the divisor signal and further having the carrier frequency of the signal representing the multiplicand. The three input signals may have a common carrier frequency or the multiplicand may have a different carrier frequency than that of the multiplier and divisor signals.

A more thorough understanding of the invention may be obtained by a study of the following detailed discussion taken in conjunction with the accompanying drawings in which FIG. 1 is a block diagram of one embodiment of this invention;

FIG. 2 is a diagram of a single pulse output from the pulse-width modulator of FIG. 1;

FIGS. 3*a* through 3*e* illustrate the waveforms at various points in the electronic computer circuit;

Figure 6:
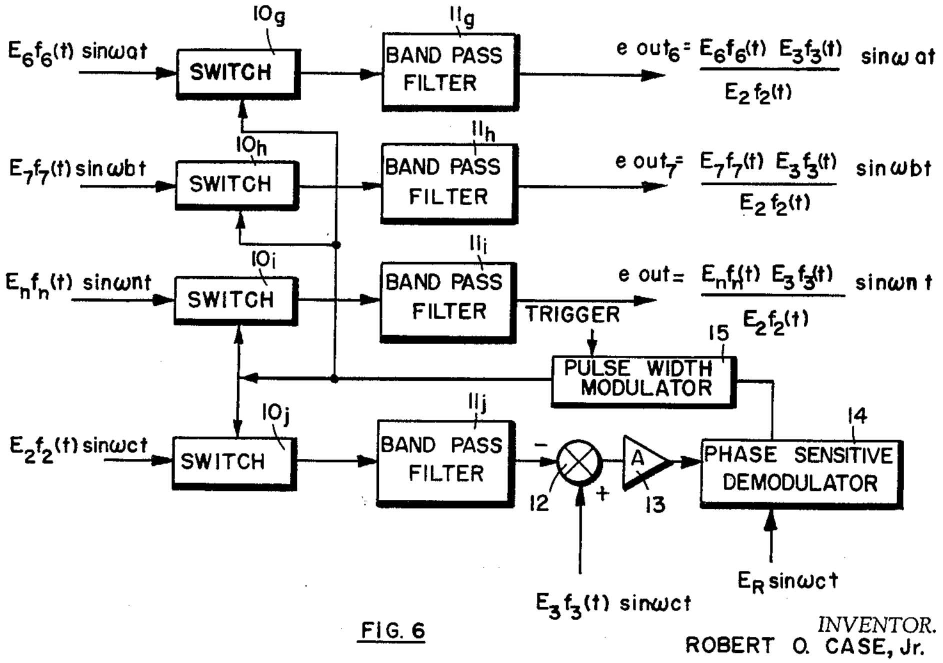

And FIG. 6 is a block diagram of a further embodiment of this invention.

Figure 1:
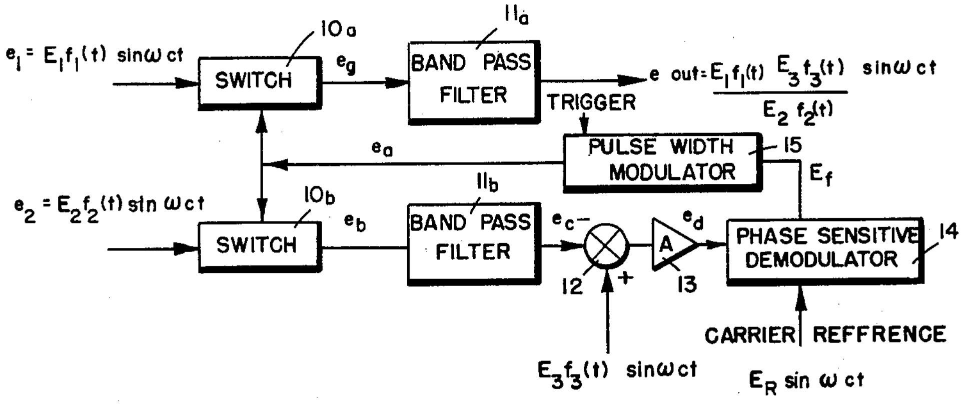

Referring now to FIG. 1, the first variable quantity (multiplicand or dividend) is represented by a variable voltage $e_1$ designated by $E_1f_1(t)\sin\omega_ct$, the second variable quantity, or divisor, is represented by a variable voltage $e_2$ designated by $E_2f_2(t)\sin\omega_ct$ while the third variable quantity or multiplier is represented by a variable voltage $e_3$ designated by $E_3f_3(t)\sin\omega_ct$. While these signals are shown as suppressed-carrier signals, neither the circuit embodiment shown in FIG. 1 or any other embodiments hereinafter described are limited to this type of modulated signal. Thus, $e_1$, $e_2$ and $e_3$ may be any amplitude-modulated carrier-frequency voltages with the stipulation that at least $e_2$ and $e_3$ have a common carrier frequency.

The multiplicand $e_1$ is applied as an input to switch 10*a*. Switch 10*a* is designed to sample the multiplicand $e_1$ at a relatively high frequency determined by the output $e_a$ of pulse width modulator 15. A monitor loop circuit includes pulse width modulator 15, switch 10*b*, band-pass filter 11*b*, summation point 12, amplifier 13, and phase sensitive demodulator 14. This monitor loop enables the duty cycle of the sampling periods to be varied in direct proportion to the modulation envelope of multiplier signal $e_3$ and inversely proportion to the modulation envelope of the divisor signal $e_2$. The output of switch 10*a*, $e_g$, is connected to the input of a band-pass filter 11*a* designed to transmit the sidebands of the modulated carrier-frequency signal with substantially zero phase shift while attenuating the frequencies of the sampling signal $e_a$. The output of the band-pass filter 11*a* is an amplitude-modulated signal having an amplitude equal to the product of $$\frac{E_1f_1(t)E_3f_3(t)}{E_2f_2(t)}$$

and the frequency of the carrier frequency $\sin\omega_ct$.

In the monitor loop referred to above, the divisor signal $e_2$ is sampled in switch 10*b* in a manner similar to that in which the multiplicand signal $e_1$ is sampled in switch 10*a*. The output of switch 10*b*, $e_b$, is introduced into band-pass filter 11*b*. Band-pass filters 11*a* and 11*b* may be identical components. The output of band-pass filter 11*b*, $e_c$, is added to the multiplier signal $e_3$ in the summation network 12. As hereinafter shown, $e_c$ is the proper phase for negative feedback. Amplifier 13 is a high-gain amplifier designed to multiply the error signal output of summation network 12. Phase-sensitive demodulator 14 is supplied with a carrier reference signal $E_R\sin\omega_ct$ and converts the envelope of the signal $e_d$ into a direct-current signal $E_f$ suitable for driving the pulse width modulator 15. The pulse width modulator may be supplied with a series of periodic trigger pulses from an external source or it may itself generate the required high-frequency pulses.

The feedback provided by the monitor loop monitors the width of the pulses making up the output ($e_a$) of the pulse width modulator 15. The operation of this loop may be more easily visualized by assuming that the signals $e_2$ and $e_3$ remain at constant values. Thus, any changes in the error signal (output of network 12) are caused by error changes in the width of the pulses in the signal $e_a$. Such changes may be caused by drift or non-linearity in the phase sensitive demodulator. A change in the error signal causes a proportional change in the direct-current signal $E_f$. This change will be of such magnitude and sign as to cause the pulse width modulator output to vary, thereby compensating for the drift error.

Figure 2:
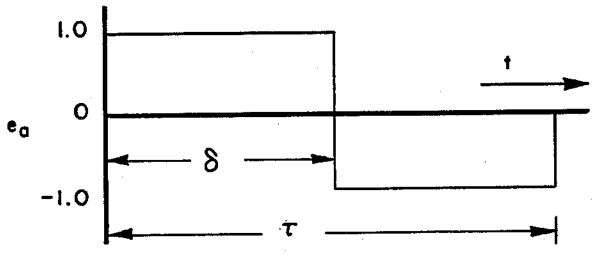

The operation of the electronic computer may be described from both a mathematical and a graphical viewpoint. Illustrated in FIG. 2 is a single switching pulse $e_a$ from the pulse width modulator 15. It may be noted that this pulse has a period of length $\tau$ and duty cycle equal to $$\frac{\delta}{\tau}$$

The pulse amplitude may, of course, be any required magnitude, but for simplicity is illustrated as having positive and negative values of 1 volt. The average value of a periodically occurring rectangular-shaped waveform may be calculated from the formula:

Average value of any periodically occurring $$\text{waveform}=\frac{1}{\tau}\int_0^\tau y(t)dt \qquad (1)$$

For the waveform illustrated in FIG. 2:

$$y(t)=1 \qquad 0<t<\delta \qquad (2)$$

$$y(t)=-1 \qquad \delta<t<\tau \qquad (3)$$

Therefore, letting $E_a$ represent the average value of $e_a$:

$$E_a=\frac{1}{\tau}\int_0^\delta dt+\frac{1}{\tau}\int_\delta^\tau(-1)dt$$

$$=\frac{1}{\tau}[\delta-(\tau-\delta)]$$

$$=\frac{1}{\tau}(2\delta-\tau)$$

$$=\left(\frac{2\delta}{\tau}-1\right) \qquad (4)$$

In a preferred embodiment of the pulse width modulator the duty cycle varies in accordance with the following equation:

$$\frac{2\delta}{\tau}=1+KE_f \qquad (5)$$

when $E_f$ is the output of the phase sensitive demodulator and K is the degree of modulation. Substituting Equation 5 in 4 permits writing:

$$E_a=KE_f \qquad (6)$$

The expression for the instantaneous value of $e_a$ is, therefore:

$$e_a=KE_f+\text{(pulse repetition rate and associated harmonics)} \qquad (7)$$

The output ($e_b$ or $e_g$) of a full wave sampling switch will be of wave shape similar to $e_a$ except that the height of the pulses will vary according to the amplitude-modulated carrier-frequency input signals. Referring to Equation 1 it will be observed that this merely multiplies the average value of the wave by the pulse height. Thus:

$$e_g=e_aE_1f_1(t)\sin\omega_c(t)+\text{(pulse repetition rate and associated harmonics)} \qquad (8)$$

or $$e_g=KE_fE_1f_1(t)\sin\omega_ct+\text{(pulse repetition rate and associated haromnics)} \qquad (9)$$

If the frequencies of the pulses from the pulse width modulator are substantially higher than the carrier frequency ($\omega_c$), a band-pass filter can be utilized to pass the sidebands associated with the carrier-frequency signal and attenuate the higher frequency terms. The output of band-pass filter 11*a* is, therefore, $$e_{out}=KE_fE_1f_1(t)\sin\omega_ct \qquad (10)$$

which is the desired amplitude-modulated carrier-frequency signal.

The desired multiplication and division is illustrated as follows: In the computer circuit shown in FIG. 1 the input to the phase sensitive demodulator is:

$$e_d=G(e_c+E_3f_3(t)\sin\omega_ct) \qquad (11)$$

where G is the gain of amplifier 13. The expression for the signal $e_c$ may be derived in the same manner as $e_{out}$ (note Equations 8 through 10. Thus, $e_c$ may be expressed as:

$$e_c=KE_fE_2f_2(t)\sin\omega_ct \qquad (12)$$

Substituting Equation 12 into Equation 11 permits writing $$e_d=G(KE_fE_2f_2(t)\sin\omega_ct+E_3f_3(t)\sin\omega_ct) \qquad (13)$$

The output of the phase sensitive demodulator is the signal $e_d$ demodulated or:

$$E_f=G(KE_fE_2f_2(t)+E_3f_3(t)) \qquad (14)$$

Solving for $E_f$ gives:

$$E_f=\frac{GE_3f_3(t)}{1-GKE_2f_2(t)} \qquad (15)$$

Since the gain G of amplifier 13 is large, the term $GKE_2f_2(t)$ is substantially greater than 1, thus:

$$E_f=\frac{-1}{K}\,\frac{E_3f_3(t)}{E_2f_2(t)} \qquad (16)$$

From Equation 16 the term $KE_f$ is found to be:

$$KE_f=-\frac{E_3f_3(t)}{E_2f_2(t)} \qquad (17)$$

and, therefore, the output signal (from Equation 10) maybe written:

$$e_{out}=-\frac{E_3f_3(t)}{E_2f_2(t)}E_1f_1(t)\sin\omega_ct \qquad (18)$$

Thus, the input signal $E_1f_1(t)\sin\omega_ct$ has been multiplied by $E_3f_3(t)$ and divided by $E_2f_2(t)$. In the circuit hereinafter shown and described, a transformer output stage included in the band-pass filter may be used for inverting the phase of the output signal thereby providing:

$$e_{out}=\frac{E_1f_1(t)E_3f_3(t)}{E_2f_2(t)}\sin\omega_ct \qquad (19)$$

Figure 3:
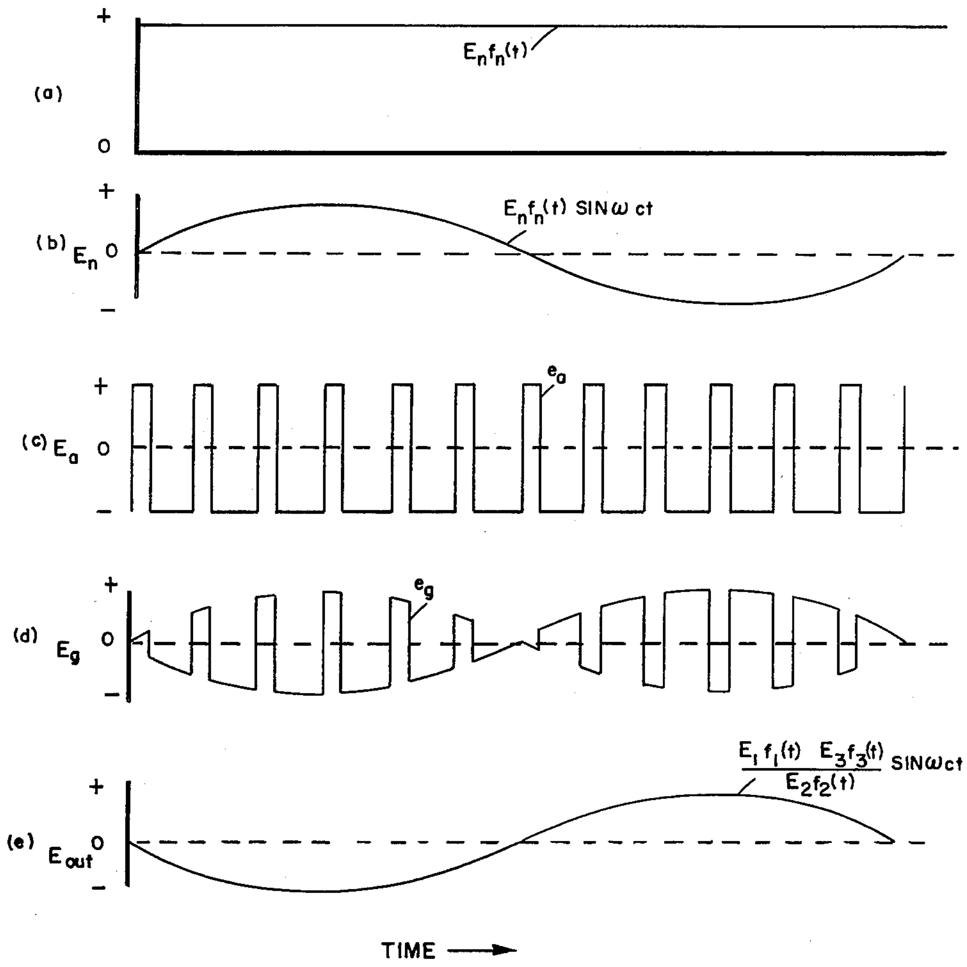

FIGURE 3 graphically illustrates the operation of this invention. This figure contains several diagrams showing the various waveforms appearing in the electronic computer. Since the graphs have a common time base, only a small portion of the waveform of a modulating-frequency signal $E_nf_n(t)$ may be shown because of its relatively low frequency; this signal is illustrated in FIG. 3*a* and appears as a direct-current voltage. A representative amplitude-modulated suppressed-carrier signal $$E_nf_n(t)\sin\omega_ct$$

is illustrated in FIG. 3*b*. The multiplicand, multiplier and divisor signals will ordinarily be signals of this type though, of course, they may be of a different amplitude and phase. In addition, the multiplicand signal $e_1$ may have a different carrier than that of the multiplier and divisor signals. FIGURE 3*c* illustrates the pulse width modulated switching signal $e_a$. For simplicity of illustration, the pulse repetition frequency has been illustrated as twelve times that of the carrier frequency. However, in practice, the pulse frequency would ordinarily be chosen considerably higher than this in order to reduce the design problems involved in obtaining a suitable band-pass filter. For example, in the actual circuit hereinafter described, the modulating-frequency signal varies from zero to approximately 100 c.p.s., the carrier-frequency signal is 400 c.p.s., and the pulse-repetition frequency is 25 kc.

The output of switch 10*a* is illustrated in FIG. 3*d*. Waveform $e_g$ is, of course, the input waveform $$E_1f_1(t)\sin\omega_ct$$

after being sampled by the waveform $e_a$. Thus, $e_g$ has a waveshape similar to $e_a$ except that the height of the pulses vary according to the modulating input. FIG. 3*e* illustrates the output of band-pass filter 11*a*; thus, FIG. 3*e* illustrates the desired output voltage $E_{out}$. It may be noted that $E_{out}$ has the same waveshape and frequency as the multiplicand (FIG. 3*b*) except that it is 180° out of phase with the multiplicand signal. This phase inversion was also noted in Equation 18. It will be understood that FIGURES 3*d* and 3*e* also represent the outputs of switch 10*b* and band-pass filter 11*b* when the divisor signal is of waveform similar to that shown in FIG. 3*b*.

Figure 4:
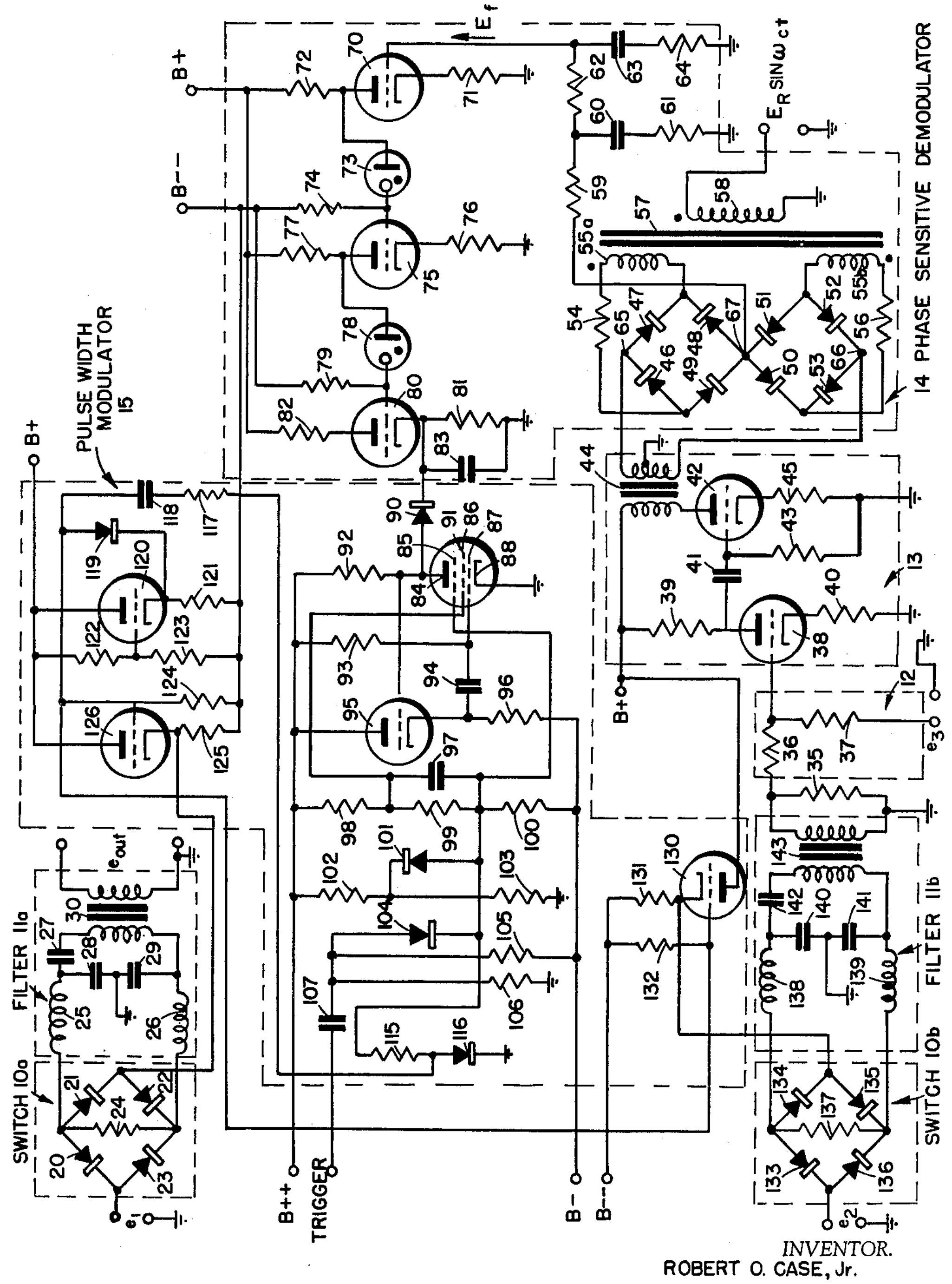
FIG. 4 is a schematic diagram of the electronic computer circuit shown in FIG. 1.

FIG. 4 illustrates schematically circuitry which may be utilized to construct an embodiment of the invention such as is shown in FIG. 1. Switch 10*a* is shown as comprising a bridge arrangement having diodes 20, 21, 22 and 23 in each of its legs. Connected in series between ground and one node of the bridge is the source of signal representing the multiplicand $e_1$. Connected to the opposite node is the output of triode 126 connected as a cathode follower. For the moment, the output of the cathode follower may be assumed to be a fairly high frequency switching voltage of either positive or negative potential. Assuming the output of the cathode follower to be a signal of positive potential, diodes 22 and 20 will be forwardly biased and diodes 21 and 23 will be reverse biased. A series path is thereby provided for the signal $e_1$ via diode 20, resistor 24 and diode 22. Contrarywise, when a negative potential is introduced from the cathode follower, diodes 21 and 23 are forwardly biased and diodes 20 and 22 are reverse biased. The conduction of the signal $e_1$ through resistor 24 is, therefore, the inverse of the condition when the bridge is biased by a positive potential, i.e., a series path is provided for the signal $e_1$ via diode 23, resistor 24 and diode 21. It will be noted that, in effect, the phase of signal $e_1$ is periodically reversed, the periods being at a relatively high frequency with respect to the carrier frequency of the signal $e_1$. Switch 10*a* of the type shown in FIG. 4 is a full wave sampling switch since the output $e_g$ (FIG. 3*d*) is centered around the zero axis.

The output of switch 10*a* is connected to the input of filter 11*a*. This filter includes inductors 25 and 26 and capacitors 27, 28 and 29. This filter is of such design that it transmits the sidebands of the modulated carrier-frequency signal with substantially zero phase shift and attenuates the frequencies of the periodic transmission path and its harmonics. Transformer 30 is used for obtaining a single ended output and a reversal of phase when desired.

Switch 10*b* and filter 11*b* include diodes 133, 134, 135 and 136, resistor 137, inductors 138 and 139, capacitors 140, 141 and 142, and transformer 143. These elements may be identical to those used in switch 10*a* and 11*a*. A source of divisor signal $e_2$ is applied to switch 10*b* in the same manner as the multiplicand signal $e_1$ is applied to switch 10*a*.

The source of multiplier signal $e_3$ is connected to a summation network 12 including resistors 36 and 37. Resistor 36 is connected to the output of filter 11*b* which appears across resistor 35. Resistor 37 is connected in series with the source of multiplier signal $e_3$. The error signal output of summation network 12 is connected to the input of amplifier 13.

Amplifier 13 is an alternating-current amplifier including triodes 38 and 42. The control electrode of triode 38 comprises the input of amplifier 13 and is, therefore, connected to the output of summation network 12. Resistor 39 connects the anode of triode 38 to a source of positive potential B+. Resistor 40 couples the cathode of triode 38 to ground. The output signal of triode 38 is capacitively coupled to the control electrode of triode 42 by capacitor 41. The anode of triode 42 is also connected to B+ through the primary winding of transformer 44. Resistors 43 and 45 respectively connect the control electrode and cathode of triode 42 to ground. The output signal from amplifier 13 is obtained by transformer 44, the primary winding of which is connected in the anode circuit of triode 42. The secondary winding of transformer 44 connects the output of amplifier 13 with the input of phase-sensitive demodulator 14.

Phase-sensitive demodulator 14 is basically a synchronous rectifier. Two diode bridges, including diodes 46, 47, 48, 49, 50, 51, 52 and 53, operate as switches synchronized with the reference frequency $E_r \sin \omega_c$. The two bridges are operated 180° out of phase with each other by interposing transformer 57 between the input of the reference frequency signal and the inputs to the diode bridges. Thus, alternate half cycles of the reference frequency signal on the primary winding 58 cause either the bridge composed of diodes 46, 47, 48 and 49 or the bridge composed of diodes 50, 51, 52 and 53 to conduct. Each of the diode bridges functions as a bi-directional switch so that together the two bridges form a full-wave bi-directional switch demodulator, the signal from the secondary winding of transformer 44 being alternately conducted from nodes 65 and 66 to node 67. The output of the bridges is taken between node 67 and ground and passed through a filter composed of resistors 59, 61, 62 and 64 and capacitors 60 and 63. This filter reduces the carrier-frequency ripple on the demodulator output signal $E_f$.

The output from the ripple filter is further amplified in a direct-coupled amplifier stage composed of triodes 70, 75 and 80. Triodes 70 and 75 provide an amplification of the signal $E_f$ and are coupled by voltage regulator tubes 73 and 78 commonly known as cold-cathode gaseous-discharge tubes. The triode 80 is connected as a cathode follower output stage. The control electrodes of triodes 75 and 80 are suitable biased by a negative source of direct potential B—, resistors 79 and 74, and the voltage regulator tubes 78 and 73. Resistors 72, 77 and 82 couple the anodes of the respective triodes with a source of positive direct potential B+. Resistors 71, 76 and 81 connect the cathodes of respective triodes 70, 75 and 80 to ground. The output of the direct-coupled amplifier is connected to the input of pulse width modulator 15.

Pulse width modulator 15 includes pentode 91 connected in a screen-coupled phantastron circuit. Pentode 91 includes anode 84, suppressor grid 85, screen grid 86, control electrode 87 and cathode 88. Trigger pulses at the desired high repetition sampling rate are coupled through capacitor 107 and diode 104 to the suppressor grid 85. When no trigger pulse is present, the control electrode of the pentode is usually at a potential at or near ground and the suppressor grid 85 is at a sufficient negative bias to cut off the anode current. Therefore, the anode 84 is at the potential of the voltage supply B+, and all of the cathode current is going to the screen grid 86 which is at some positive potential. A positive trigger pulse on the suppressor grid 85 causes current to flow in the anode and the anode voltage immediately drops due to the voltage drop across resistor 92. Since the anode is coupled to the control electrode 87 by triode 95 (connected as a cathode follower) and capacitor 94, the anode voltage drops only a few volts before the control electrode voltage is reduced and the anode current is reduced to a very low value. Since the introduction of the trigger pulse therefore, the total cathode current has been greatly reduced, the screen current has been greatly reduced so that a large positive wave appears at the screen grid, and a small anode current is flowing. The next stage of operation is known as the Miller action. Capacitor 94, having previously been charged to a potential determined by B+, begins to discharge exponentially. The electron current flowing to the anode of pentode 91 causes the plate voltage to tend to drop exponentially. However, the capacitor is also coupled to the control electrode of the pentode. Thus, the grid signal would be expected to rise exponentially. However, this rise is effectively amplified by the tube and the grid potential is prevented from rising as rapidly as it otherwise would. This overall effect of increasing the rise time may be considered an increase in the time constant of the charging circuit. The anode potential decreases until the anode "bottoms," i.e., the potential runs against the "knee" in the anode curve. At this point, the screen current increases, causing the screen voltage to drop. This drop is coupled to the suppressor grid by capacitor 97 and the resistor 99 so that the anode current is reduced thereby causing the anode potential to increase. This increase is transferred to the control electrode via triode 95 and capacitor 94 and the action is regenerative. The circuit will then return to its original state. With the anode current cut off, all the cathode current again goes to the screen grid whereupon the screen voltage falls.

Diode 101 prevents the suppressor electrode from "sticking" because of secondary electron emission caused by too high a potential upon it. Also, by reducing the total potential change upon the suppressor, a more rapid turn-on and turn-off of the pentode is obtained by the use of diode 101. Capacitor 97, connected between the suppressor and screen grids is a speeding-up condenser. Resistors 92, 93, 96, 98, 100, 102, 103, 105 and 106 connected as shown in FIG. 4 provide biasing connections for the aforementioned phantastron circuit.

The modulation of the pulse width is provided by introducing the output signal from the phase sensitive demodulator 14 (amplified in the direct coupled amplifier) through diode 90 to the anode 84 of pentode 91. This provides a linear control of the width of the rectangular wave which appears on the suppressor grid 85 of pentode 91.

The waveform on the suppressor grid 85 is connected to a clipping circuit which includes resistors 115 and 117, capacitor 118, diodes 116 and 119, triode 120, and resistors 121, 122 and 123.

As shown in FIG. 4, switch 10*a* is in series with the output stage of the pulse width modulator 15. Therefore, a voltage drop across the output stage would lower the magnitude of the switch output signal $e_g$ unless the impedance of the output stage was small enough to be neglected. For this reason, the output of the clipping circuit is connected to a triode 126 operating in a cathode follower low output impedance circuit. Since switch 10*b* is likewise in series with the output stage of the pulse width modulator, a second cathode follower including triode 130 is provided to drive this switch. Thus, a pulse width modulated signal having a repetition frequency equal to the trigger signal is applied as the switching voltage $e_a$ (FIG. 1) to switches 10*a* and 10*b*. Resistors 124, 125, 131 and 132 connected as shown provide biasing connections for the two cathode follower circuits.

The design of the individual circuit elements shown in FIG. 4 is well known to those skilled in the art and for this reason the values of circuit components used are not recited.

An important advantage of this invention is that the phase-sensitive demodulator is employed at a high gain level inside the monitor loop. Thus, the phase-sensitive demodulator may have relatively large drift and be quite non-linear and yet not affect the accuracy of the product and quotient computer. The feedback afforded by the monitor loop and resulting demodulation of an error signal only (the output of summation network 12) is of special importance since the demodulation stage is the element most prone to introduce error in this type of computer. As noted above, certain prior art circuits are adaptable for use with modulated carrier frequency inputs if appropriate demodulating circuits were provided for each of such inputs. As noted then, however, this is not a satisfactory solution since the non-linearity and drift of the demodulators limits the computer accuracy.

A further advantage of this invention is that the carrier voltage of the multiplicand signal $e_1$ is carefully preserved as to waveform, frequency and phase. In the switch 10*a* only the R.M.S. amplitude is changed by the operation of the switch. The filter 10*b* is specifically designed as a band-pass filter with zero phase shift at the midpoint or carrier frequency. A filter comprising passive elements usually permits zero phase shift at only a single frequency. A variation in either the frequency of the carrier or the mid-band frequency of the filter (e.g., due to a change in the passive elements due to temperature variation, etc.) will cause a phase shift in the signal being transmitted through the filter unless otherwise compensated for. In this invention, however, the phase slope may be made relatively small over a range of many cycles per second because of the wide frequency range between the midband and high cutoff frequency.

Figure 5:
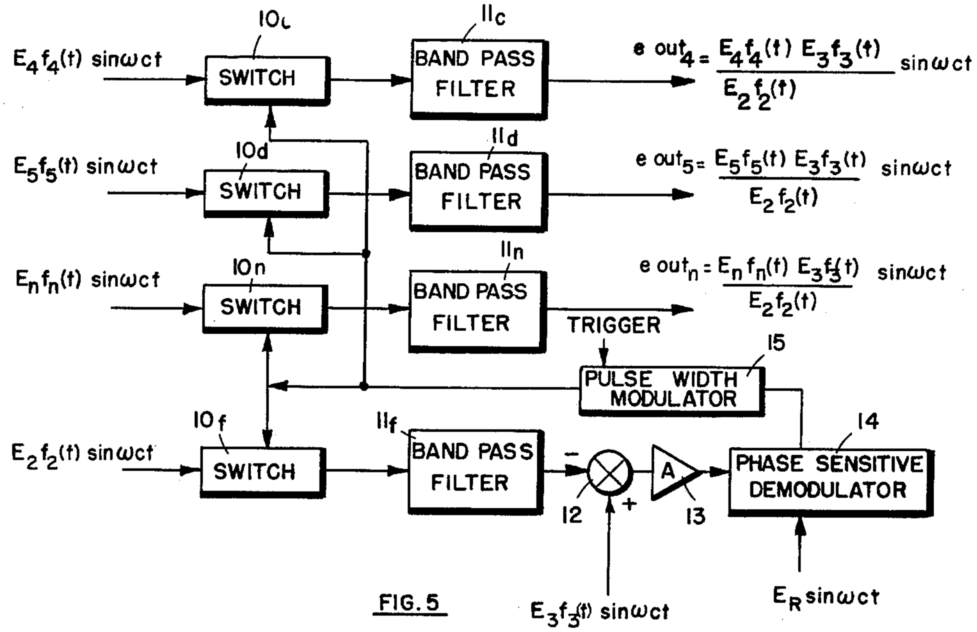
FIG. 5 is a block diagram of another embodiment of this invention.

FIG. 5 illustrates an embodiment of the electronic computer in which a plurality of multiplicand signals are multiplied by a common multiplier signal and divided by a common divisor signal. The circuit is very similar to the previously illustrated in FIG. 1 with the exception that the output of pulse width modulator 15 drives a plurality of switches 10*c*, 10*d* and 10*n*, each of which may be structurally and functionally similar to switch 10*a*. Each of the switches may have a different multiplicand signal applied thereto. Thus, each different multiplicand signal, i.e., $E_4f_4(t)\sin\omega_ct$, $E_5f_5(t)\sin\omega_ct$ and $E_nf_n(t)\sin\omega_ct$, is multiplied by the ratio $$\frac{E_3f_3(t)}{E_2f_2(t)}$$

In the circuitry hereinbefore shown in FIG. 4, the embodiment of FIG. 5 could easily be provided by connecting additional cathode follower circuits such as triode 126 between the output of the clipping circuit contained in the pulse width modulator 15 and the additional switches 10*c*, 10*d* and 10*n*. Band-pass filters 11*c*, 11*d* and 11*n* may be structurally and functionally similar to band-pass filter 11*a*.

FIG. 6 illustrates another embodiment of the electronic computer in which a plurality of multiplicand signals, e.g., $E_6f_6(t)\sin\omega_at$, $E_7f_7(t)\sin\omega_bt$ and $E_nf_n(t)\sin\omega_nt$, having different carrier frequencies are multiplied by the ratio of the modulation envelopes of the multiplier and divisor signals $$\left[\frac{E_3f_3(t)}{E_2f_2(t)}\right]$$

This embodiment could be identical in structure to that shown in FIG. 5 with the exception that the band-pass filters 11*g*, 11*h* and 11*i* would each be designed to have a band-pass centered at the respective carrier frequency of the multiplicand signal. Switches 10*g*, 10*h* and 10*i* may be structurally and functionally similar to switch 10*a*.

A significant corollary is that of using the circuit shown in FIG. 6 to modify the carrier frequency of any amplitude-modulated wave without affecting its waveform, phase or amplitude. Thus, by connecting the wave to be modified as $e_3$ and a signal having the desired carrier frequency and known amplitude as $e_6$ etc. the output wave is proportoinal in amplitude to the wave $e_3$ and has the desired new carrier frequency of wave $e_6$. It is significant that this carrier frequency of $e_3$ is modified without the necessity of demodulating the wave $e_3$. As previously noted, only an error signal is demodulated in a computer constructed in accordance with this invention. In this application signal $e_2$ will be supplied as a reference signal of arbitrary fixed amplitude.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electronic multiplier having an input and output, switch means periodically interconnecting said input and said output of said electronic multiplier, a source of an amplitude-modulated carrier frequency multiplicand signal connected to said input, the carrier frequency of said signal being substantially lower than the frequency of operation of said switch means; closed loop monitor means for causing the duty cycle of said switch means to vary according to the modulation envelope of an amplitude-modulated multiplier signal, and means interposed between said switch means and said output for transmitting the sidebands associated with the multiplicand signal and attenuating the frequencies of said periodic transmission path and its harmonics.

2. An electronic quotient computer comprising means for periodically sampling an amplitude-modulated carrier frequency dividend signal, the frequency of said periodic sampling being substantially higher than the carrier frequency of said dividend signal; closed loop monitor, means for varying said sampling periods inversely proportional to the modulation envelope of an amplitude-modulated divisor signal, and means connected to said means for periodically sampling for transmitting the sidebands associated with the dividend signal and attenuating the frequencies of the sampling period and the harmonics associated therewith.

3. In an electronic multiplier, signal means for supplying a periodic pulsed signal, pulse width modulation means for varying the duty cycle of said pulsed signal in accordance with the modulation envelope of an amplitude-modulated carrier frequency multiplier signal, the frequency of said periodic pulsed signal being substantially higher than said carrier frequency, switching means responsively connected to said pulse width modulation means for sampling an amplitude-modulated multiplicand signal, and means connected to said switching means for transmitting the sidebands associated with the multiplicand signal and attenuating the frequencies of the periodic pulsed signal and the harmonics associated therewith.

4. An electronic computer for simultaneously computing the product of the modulation envelopes of an amplitude-modulated multiplicand signal and an amplitude-modulated multiplier signal and the quotient between said product and the modulation envelope of an amplitude-modulated divisor signal, said computer comprising means for periodically sampling said amplitude-modulated carrier frequency multiplicand signal, the frequency of said periodic sampling being substantially higher than the carrier frequency of said multiplicand signal; closed loop monitor means for varying said sampling periods directly proportional to the modulation envelope of the amplitude-modulated multiplier signal and inversely proportional to the modulation envelope of said amplitude-modulated divisor signal, and means connected to said means for periodically sampling for transmitting the sidebands associated with the carrier frequency of said multiplicand signal and attenuating the frequencies of the sampling period and the harmonics associated therewith.

5. In an electronic multiplier, means for alternately providing a low impedance path for an amplitude-modulated carrier frequency multiplicand signal and its phase inverse, the frequency at which said means alternates being substantially higher than the carrier frequency of said multiplicand signal, means for varying the time periods for which said low impedance path is provided according to the modulation envelope of an amplitude-modulated multiplier signal, and a means connected to the output of said low impedance path for transmitting the sideband frequencies associated with the multiplicand signal and attenuating the frequencies associated with said variable time periods.

6. In an electronic multiplier, switch means alternately interconnecting a source of an amplitude-modulated carrier frequency multiplicand signal and its phase inverse to an output of said electronic multiplier, pulse width modulation means for varying the duty cycle of said switch means proportionally to the modulation envelope of an amplitude-modulated multiplier signal, and means connected to said output for transmitting the sideband frequencies associated with the multiplicand signal and attenuating the frequencies associated with the operating frequency of said switch means.

7. In an electronic multiplier, signal means for supplying a periodic pulsed signal, pulse width modulation means for varying the duty cycle of said pulsed signal in accordance with the modulation envelope of an amplitude-modulated multiplier signal, switching means responsively connected to said pulse width modulation means for sampling an amplitude-modulated multiplicand signal and its phase inverse, and means connected to the output of said switching means for transmitting the sidebands associated with the multiplicand signal and attenuating the frequencies of the periodic pulsed signal and its harmonics.

8. A computer comprising an input for receiving an amplitude-modulated carrier frequency signal, an output, first switching means for cyclically transmitting said signal to said output during periods having a duration determined by a control signal coupled thereto, a first bandpass filter interposed between said switching means and said output for transmitting the sidebands associated with said signal, and monitor means for generating said control signal, said monitor means comprising a second input for receiving a second amplitude modulated signal, a demodulator, second switching means responsive to said control signal for cyclically transmitting said second signal to said demodulator during periods determined by said control signal, a second bandpass filter interposed between the output from said second switch means and the input to said demodulator for transmitting the sidebands associated with said second signal and means responsively coupled with said demodulator for generating said control signal.

9. In an electronic computer, first means for periodically sampling an amplitude-modulated multiplicand signal, second means for periodically sampling an amplitude-modulated divisor signal, third and fourth means respectively connected to a source of said sampled multiplicand signal and said sampled divisor signal for transmitting the sidebands associated with the carrier frequencies of said multiplicand and divisor signals and attenuating the frequencies of the sampling period and the harmonics associated therewith, the output of said fourth means comprising a feedback signal, a source of amplitude-modulated multiplier signal, and means including a phase sensitive demodulator and pulse width modulator which are responsive to the sum of said feedback and said input multiplier signals for varying the duration of said sampling periods directly proportionally to the modulation envelope of said multiplier signal and inversely proportionally to the modulation envelope of said divisor signal, the output of said third means comprising the simultaneously computed product of the modulation envelopes of said multiplicand signal and said multiplier signal and the quotient between said product and the modulation envelope of said divisor signal, said output signal being an amplitude-modulated signal having the same carrier frequency as said multiplicand signal.

10. An electronic computer for simultaneously computing the product of the modulation envelopes of an amplitude-modulated multiplicand signal and an amplitude-modulated multiplier signal and the quotient between said product and the modulation envelope of an amplitude-modulated divisor signal, said computer comprising signal means for supplying a periodic pulsed signal, first and second switching means connected to said signal means and controlled by the duty cycle thereof, means for feeding said multiplicand signal to said first switching means, first filter means connected to said first switching means for transmitting the sidebands associated with the carrier frequency of the multiplicand signal and attenuating the frequencies of the periodic pulsed signal and its harmonics, means for feeding said divisor signal to said second switching means, second filter means connected to said second switching means for transmitting the sidebands associated with the carrier frequency of the divisor signal and attenuating the frequencies of the periodic pulsed signal and its harmonics, the output of said second filter means comprising a feedback signal, means for adding said feedback and said multiplier signals thereby producing an error signal, means for demodulating said error signal thereby producing a direct-current signal, and pulse width modulator means for varying the duty cycle of said pulsed signal in accordance with the magnitude of said direct-current signal, the output of said first filter means comprising an amplitude-modulated signal representing the desired computation.

11. In an electronic computer, a plurality of fixed frequency means for periodically providing a low impedance path between respective inputs and outputs of said electronic computer, a source of an amplitude-modulated multiplicand signal connected to each of said inputs, feedback means for varying said periods of low impedance proportionally to the modulation envelope of an amplitude-modulated multiplier signal and inversely proportionally to the modulation envelope of an amplitude-modulated divisor signal, said feedback means including switching means responsively connected to an output of said feedback means for periodically providing a low impedance path between a source of said divisor signal and an input to said feedback means, and means connected to each of said outputs for transmitting the sidebands associated with the carrier frequency of the respective multiplicand signal and attenuating the frequencies of said periodic transmission path and its harmonics.

12. In an electronic computer, a plurality of switch means periodically inter-connecting inputs and outputs of said electronic computer, a plurality of sources of amplitude-modulated multiplicand signals respectively connected to said inputs, feedback means for causing the duty cycle of each of said switch means to vary proportionally to the modulation envelope of an amplitude-modulated multiplier signal and inversely proportionally to the modulation envelope of an amplitude-modulated divisor signal, said feedback means including switching means responsively connected to an output of said feedback means for periodically providing a low impedance path between a source of said divisor signal and an input to said feedback means, and means connected to each of said outputs for transmitting the sidebands associated with the carrier frequency of the respective multiplicand signal and attenuating the frequencies of said periodic transmission path and its harmonics.

13. A computer for modifying the carrier frequency of a first amplitude-modulated signal comprising fixed frequency means for periodically sampling a second amplitude-modulated signal having the desired carrier frequency, pulse width modulation means for varying said sampling periods according to the modulation envelope of said first signal, and means connected to said fixed frequency means for transmitting the sidebands associated with the carrier frequency of said second signal and attenuating the frequencies of the sampling period and the harmonics associated therewith.

14. A computer for modifying the carrier frequency of a first amplitude-modulated signal comprising an input for receiving a second amplitude-modulated signal having the desired carrier frequency, an output, first switching means for cyclically transmitting said second signal to said output during periods having a duration determined by a pulse width control signal coupled thereto, first bandpass filter means interposed between said first switching means and said output for transmitting the sidebands associated with said second signal, monitor means for generating said control signal, said monitor means receiving a reference amplitude-modulated signal, second switching means responsive to said control signal for cyclically transmitting said first signal, summing means for adding the output signal from said second switching means and a source of a third amplitude modulated carrier frequency signal thereby producing an error signal, second bandpass filter means interposed between said second switching means and said summing means for transmitting the sidebands associated with said first signal a demodulator coupled to said summing means, said monitor means being responsively coupled to said demodulator.

15. In an electronic computer, a plurality of first means for periodically sampling respective amplitude-modulated multiplicand signals, second means for periodically sampling an amplitude-modulated divisor signal, a plurality of third means respectively connected to each of said sampled multiplicand signals for transmitting the carrier frequency associated with the respective multiplicand signal and attenuating the frequencies of the sampling period and the harmonics associated therewith, fourth means respectively connected to said second means for transmitting the carrier frequency associated with said divisor signal and attenuating the frequencies of the sampling period and the harmonics associated therewith, the output of said fourth means comprising a feedback signal, a source of input amplitude-modulated multiplier signal, means for adding said feedback and said multiplier signals thereby producing an error signal, phase sensitive demodulator means for demodulating said error signal thereby providing a resultant demodulated error signal, pulse width modulator means responsive to said demodulated error signal for varying the duration of said sampling periods, the output of each of said third means comprising an amplitude-modulated signal representing the desired computation.

16. In an electronic computer, a plurality of first switching means for periodically inter-connecting respective first inputs and first outputs of said electronic computer, said first inputs adapted to receive a plurality of amplitude-modulated multiplicand signals, each of said multiplicand signals having a carrier frequency different than the carrier frequencies of the other multiplicand signals, second switching means for periodically interconnecting a second input and second output of said electronic computer, a source of amplitude-modulated divisor signal connected to said second input, a first filter means connected to each of said first outputs for transmitting the sidebands associated with the carrier frequency of the respective multiplicand signals and attenuating the frequencies of said periodic transmission path and its harmonics, a second filter means connected to said second output for transmitting the sidebands associated with the carrier frequency of the divisor signal and attenuating the frequencies of said periodic transmission path and its harmonics, the output of said second filter means comprising a feedback signal, a source of input amplitude-modulated multiplier signal, means for adding said feedback and said multiplier signals thereby producing an error signal, means for amplifying said error signal, phase sensitive demodulator means for demodulating said error signal thereby producing a resultant demodulated error signal, pulse width modulator means responsive to said demodulator error signal for causing the duty cycle of said first and second switch means to vary proportionally to the modulation envelope of said multiplier signal and inversely proportionally to the modulation envelope of said divisor signal, the output of said first filter means comprising an amplitude-modulated signal representing the desired computation.

17. An electronic computer for simultaneously computing the product of the modulating envelopes of an amplitude-modulated multiplicand signal and an amplitude-modulated multiplier signal and the quotient between said product and the modulation envelope of an amplitude-modulated divisor signal, said computer comprising a first switch having an input connected to a sounce of said multiplicand signal, a second switch having an input connected to a source of said divisor signal, a first band-pass filter connected to the output of said first switch, said first filter having a mid-band frequency at the carrier frequency of said multiplicand signal and an upper cutoff frequency below the frequencies associated with the operating frequency of said switch means, said first filter further having substantially zero phase shift at said mid-band frequency, a second band-pass filter connected to the output of said second switch, said second filter having a mid-band frequency at the carrier frequency of said divisor signal and an upper cutoff frequency below the frequencies associated with the operating frequency of said switch means, said second filter further having substantially zero phase shift at said mid-band frequency, the output of said second fitler comprising a feedback signal, a summing circuit connected for adding said feedback and said multiplier signal thereby producing a resultant error signal, an electronic alternating-current amplifier for amplifying said error signal, a phase sensitive demodulator connected to the output of said amplifier for demodulating said amplified error signal, a pulse width modulator circuit connected to said phase sensitive demodulator and responsive to said demodulated error signal, said pulse width modulator circuit varying the pulse width of high frequency trigger pulses according to said demodulated error signal, said pulse width modulator being connected to said first and second switches for controlling the duty cycle thereof according to the duty cycle of the pulse width modulator output signal, the output of said first bandpass filter comprising an amplitude-modulated signal representing the desired computation.

18. A computer comprising a first source of an amplitude modulated carrier frequency multiplicand signal, a first fixed frequency switching means interposed between said first source and the output of the computer for periodically sampling said multiplicand signal at a sampling frequency substantially higher than said multiplicand carrier frequency, a first bandpass filter interposed between said first switching means and said output for transmitting the sidebands associated with said multiplicand signal and attenuating the switching frequency and harmonics thereof associated with said first switching means, feedback monitor means for providing a pulse width control signal of fixed frequency and variable duty cycle, the output of said monitor means being operatively connected to drive said first switching means, a second source of an amplitude modulated carrier frequency divisor signal, a third source of an amplitude modulated carrier frequency multiplier signal, summing means for summing said divisor and multiplier signals for generating an error signal, a second switching means responsively connected to said monitor means and interposed between said second signal source and said summing means for periodically sampling said divisor signal at a fixed frequency substantially higher than said divisor carrier frequency, a second bandpass filter interposed between said second switching means and said summing means for transmitting the sidebands associated with said divisor signal and attenuating the switching frequency and harmonics thereof associated with said second switching means, and a high gain amplifier responsive to said error signal for driving said monitor means, whereby the duty cycle of said fixed frequency control signal varies as the amplitude envelope of said multiplier signal and inversely as the amplitude envelope of the divider signal.

19. An electronic computer comprising means for periodically sampling a first amplitude-modulated carrier frequency signal at a sampling frequency substantially higher than the carrier frequency of said signal, clo-ed loop monitor means for varying said sampling periods according to the modulation envelope of a second amplitude-modulated signal, and means connected to said means for periodically sampling for transmitting the sidebands associated with the first amplitude-modulated signal and attenuating the frequencies of the sampling period and the harmonics associated therewith, said means connected to means for periodically sampling comprising a band-pass filter having a mid-band frequency at the carrier frequency of said first signal and an upper cutoff frequency below the frequencies of the sampling period and the harmonics associated therewith, said filter having substantially zero phase shift at said mid-band frequency.

References Cited in the file of this patent

UNITED STATES PATENTS

| | | |
|---|---|---|
| 2,497,883 | Harris | Feb. 21, 1950 |
| 2,710,348 | Baum et al. | June 7, 1955 |
| 2,805,021 | Weibel | Sept. 3, 1957 |
| 2,966,306 | Isabeau | Dec. 27, 1960 |

OTHER REFERENCES

Revue HF Tijdschrift (Isabeau) 1953, pp. 213–218. Published in Brussels.